US010676129B2

(12) United States Patent
Varunjikar et al.

(10) Patent No.: US 10,676,129 B2
(45) Date of Patent: Jun. 9, 2020

(54) DRIVER NOTIFICATION USING HANDWHEEL ACTUATORS IN STEER-BY-WIRE SYSTEMS

(71) Applicant: STEERING SOLUTIONS IP HOLDING CORPORATION, Saginaw, MI (US)

(72) Inventors: Tejas M. Varunjikar, Rochester Hills, MI (US); Prerit Pramod, Saginaw, MI (US); Julie A. Kleinau, Bay City, MI (US); Michael Eickholt, Chesaning, MI (US); Rangarajan Ramanujam, Saginaw, MI (US); Dennis B. Skellenger, Saginaw, MI (US); Steven D. Klein, Munger, MI (US)

(73) Assignee: Steering Solutions IP Holding Corporation, Saginaw, MI (US)

( * ) Notice: Subject to any disclaimer, the term of this patent is extended or adjusted under 35 U.S.C. 154(b) by 54 days.

(21) Appl. No.: 16/017,162

(22) Filed: Jun. 25, 2018

(65) Prior Publication Data
US 2019/0389508 A1   Dec. 26, 2019

(51) Int. Cl.
*B62D 5/04*      (2006.01)
*B62D 6/10*      (2006.01)
*B62D 6/04*      (2006.01)

(52) U.S. Cl.
CPC ............. *B62D 5/0481* (2013.01); *B62D 6/10* (2013.01); *B60W 2510/20* (2013.01); *B62D 6/04* (2013.01)

(58) Field of Classification Search
CPC .......... B62D 5/0481; B62D 6/10; B62D 6/04; B62D 6/008; B60W 2510/20
See application file for complete search history.

(56) References Cited

U.S. PATENT DOCUMENTS

| 5,896,942 | A * | 4/1999 | Bohner ..................  | B62D 5/006 180/402 |
| 6,370,460 | B1 * | 4/2002 | Kaufmann ............. | B62D 5/001 180/402 |
| 6,389,343 | B1 * | 5/2002 | Hefner ................... | B62D 5/006 180/443 |
| 6,799,105 | B2 * | 9/2004 | Stout ...................... | B62D 6/002 180/421 |
| 6,991,573 | B2 * | 1/2006 | Yun ....................... | B62D 5/0427 180/402 |

(Continued)

*Primary Examiner* — Babar Sarwar
(74) *Attorney, Agent, or Firm* — Dickinson Wright PLLC (57) ABSTRACT

According to one or more embodiments of the present invention a steer by wire steering system includes a deviation detection unit configured to determine a deviation signal that is indicative of a disturbance in one or more components coupled to a rack. The steer by wire steering system further includes a handwheel notification module configured to generate a modification signal based on the deviation signal, in response to the deviation signal being detected for at least a predetermined duration. The steer by wire steering system further includes a handwheel control module that generates an input command corresponding to a reference torque generated by a road wheel actuator, a feedback torque for a driver is generated based on the input command. The handwheel control module further modifies the input command using the modification signal, the modification providing a notification corresponding to the disturbance to the driver.

20 Claims, 6 Drawing Sheets

(56) References Cited

U.S. PATENT DOCUMENTS

| | | | | |
|---|---|---|---|---|
| 6,997,281 | B2* | 2/2006 | Chernoff | B60T 7/085 180/333 |
| 2002/0035424 | A1* | 3/2002 | Kaufmann | B62D 5/001 701/41 |
| 2002/0157894 | A1* | 10/2002 | Hjelsand | B62D 5/003 180/446 |
| 2002/0170758 | A1* | 11/2002 | Shimabukuro | B60K 6/48 180/65.25 |
| 2002/0189888 | A1* | 12/2002 | Magnus | B62D 5/006 180/402 |
| 2003/0150366 | A1* | 8/2003 | Kaufmann | B63B 39/061 114/144 RE |
| 2004/0153228 | A1* | 8/2004 | Matsumoto | B60T 8/17552 701/41 |
| 2004/0238258 | A1* | 12/2004 | Ono | B62D 1/163 180/402 |
| 2009/0009305 | A1* | 1/2009 | Kataoka | B60W 50/14 340/435 |
| 2009/0024279 | A1* | 1/2009 | Takeda | B60W 50/16 701/41 |
| 2014/0133699 | A1* | 5/2014 | Guan | G06K 9/00798 382/103 |
| 2015/0167823 | A1* | 6/2015 | Min | F16H 59/08 74/473.3 |
| 2015/0344068 | A1* | 12/2015 | Taniguchi | B62D 15/025 701/41 |
| 2016/0264172 | A1* | 9/2016 | Oiki | B62D 6/02 |
| 2019/0111969 | A1* | 4/2019 | Pramod | B62D 5/006 |
| 2019/0176883 | A1* | 6/2019 | Stanford | B62D 5/001 |

\* cited by examiner

DRIVER NOTIFICATION USING HANDWHEEL ACTUATORS IN STEER-BY-WIRE SYSTEMS

BACKGROUND

An electric power steering (EPS) typically includes components such as steering wheel, column, rack-pinion gear, electric motor actuator etc. The EPS helps the driver to steer a vehicle by providing necessary torque assist. The assist torque is based on driver's applied torque. In a steady-state sense, the driver torque and assist torque counter the rack force generated because of tire-road interaction.

A typical Steer by wire (SbW) system includes a road-wheel actuator (RWA) unit and handwheel (or steering wheel) actuator (HWA) unit. Unlike the EPS, the two units in the SbW are mechanically disconnected and communicate through controlled area network (CAN) interface (or other similar digital communication protocols). The HWA unit receives a rack force signal from the RWA unit to generate an appropriate torque feel for the driver. Alternatively, the handwheel angle and vehicle speed can also be used to generate desired torque feel to the driver. The angle from HWA unit is sent to the RWA unit which performs position control to control rack travel.

For a vehicle with either an EPS or a SbW system, any deviation from the normal vehicle/steering operation would be generally reflected in steering or vehicle signals. Such signals can be used to detect the deviation being experienced by the vehicle at that moment as well as over the time. In the EPS, because the steering wheel is mechanically connected to the rack unit, the driver can experience rack force disturbances due to road surface variation (banking, pothole, road texture) or tire/wheel related phenomenon (wheel imbalance, brake disturbance) directly while steering using the EPS. In the SbW system, it is desirable to provide a notification to the driver in response to the deviation caused by rack force disturbances due to road surface variation (banking, pothole, road texture) or tire/wheel related phenomenon.

SUMMARY

According to one or more embodiments of the present invention a steer by wire steering system includes a deviation detection unit configured to determine a deviation signal that is indicative of a disturbance in one or more components coupled to a rack. The steer by wire steering system further includes a handwheel notification module configured to generate a modification signal based on the deviation signal, in response to the deviation signal being detected for at least a predetermined duration. The steer by wire steering system further includes a handwheel control module that generates an input command corresponding to a reference torque generated by a road wheel actuator, a feedback torque for a driver is generated based on the input command. The handwheel control module further modifies the input command using the modification signal, the modification providing a notification corresponding to the disturbance to the driver.

According to one or more embodiments of the present invention a method for generating a driver notification in a steer by wire steering system includes determining, by a deviation detection unit, a deviation signal that is indicative of a disturbance in one or more components coupled to a rack. The method further includes generating, by a handwheel notification module, a modification signal based on the deviation signal, in response to the deviation signal being detected for at least a predetermined duration. The method further includes generating, by a handwheel control module, an input command corresponding to a reference torque generated by a road wheel actuator, a feedback torque for a driver is generated based on the input command. The method further includes modifying, by the handwheel control module, the input command using the modification signal, the modification providing a notification corresponding to the disturbance to the driver.

According to one or more embodiments of the present invention a driver notification system includes a deviation detection unit to determine a deviation signal in a rack force generated by a road wheel actuator. The driver notification system further includes a handwheel notification module to generate a modification signal based on the deviation signal, in response to the deviation signal being detected for at least a predetermined duration. The driver notification system further includes a handwheel control module that generates an input command corresponding to the rack force generated by the road wheel actuator, a feedback torque for a driver is generated based on the input command. The handwheel control module further modifies the input command using the modification signal, the modification providing a notification corresponding to the deviation to the driver.

These and other advantages and features will become more apparent from the following description taken in conjunction with the drawings.

DETAILED DESCRIPTION

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings.

As used herein the terms module and sub-module refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality. As can be appreciated, the sub-modules described below can be combined and/or further partitioned.

The present application is generally related to steering systems, and particularly describes one or more techniques for providing driver notification using handwheel actuators in steer by wire type steering systems.

An electric power steering (EPS) typically includes components such as steering wheel, column, rack-pinion gear, electric motor actuator etc. The EPS helps the driver to steer a vehicle by providing necessary torque assist. The assist torque is based on driver's applied torque. In a steady-state sense, the driver torque and assist torque counter the rack force generated because of tire-road interaction.

Figure 1:
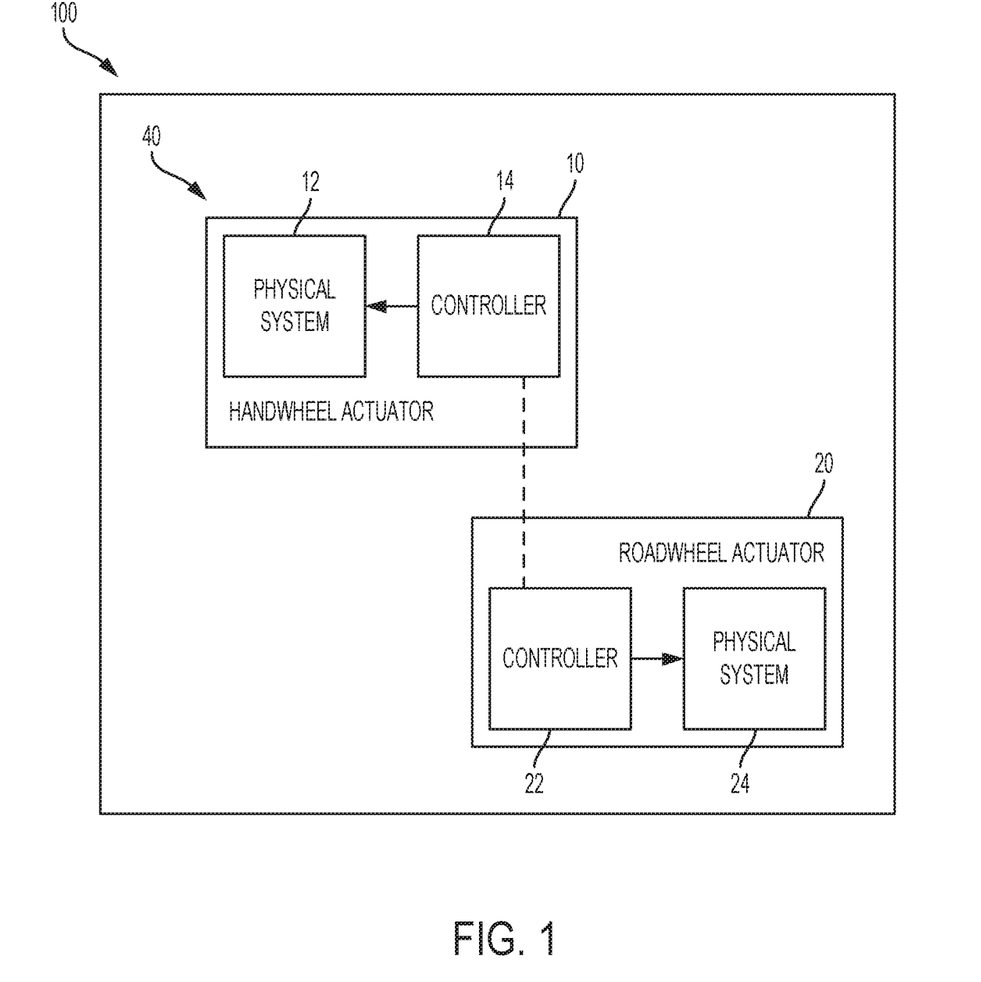
FIG. 1 is an exemplary embodiment of a steer by wire steering system according to one or more embodiments.

Referring now to the Figures, where the invention will be described with reference to specific embodiments, without limiting same, a steer by wire steering (SbW) system 40 in a vehicle 100 is depicted in FIG. 1. It will be appreciated that the SbW system 40 shown and described can be used in an autonomous or semi-autonomous vehicle or in a more conventional vehicle. The SbW system 40 includes a handwheel actuator (HWA) 10 and a roadwheel actuator (RWA) 20.

The HWA 10 includes one or more mechanical components 12, such as a handwheel (steering wheel), a steering column, a motor/inverter attached to the steering column either through a gear mechanism or a direct drive system. The HWA 10 further includes a microcontroller 14 that controls the operation of the mechanical components 12. The microcontroller 14 receives and/or generates torque via the one or more mechanical components 12.

The RWA includes one or more mechanical components 22, such as a steering rack and/or pinion coupled to a motor/inverter through a ball-nut/ball-screw (gear) arrangement, and the rack is connected to the vehicle roadwheels/tires through tie-rods. The RWA 20 includes a microcontroller 24 that controls the operation of the mechanical components 22. The microcontroller 24 receives and/or generates torque via the one or more mechanical components 22.

The microcontrollers 12 and 24 are coupled through electrical connections that allow signals to be transmitted/received. As referred to herein, a controller can include a combination of the HWA controller 12 and the RWA controller 22, or any one of the specific microcontrollers.

In one or more examples, the controllers 12 and 22 SbW system 12 communicate with each other through CAN interface (or other similar digital communication protocols). Guidance of the vehicle 100 that is fitted with the SbW system 40 is performed by use of the steering gear, with an input shaft that is rotated by the RWA 20, such as a servo actuator. The RWA 20 receives an electronic communication signal of rotation of the steering wheel by the driver. A driver controls the steering wheel to directionally control the vehicle 100. The angle from HWA 10 is sent to the RWA 20 which performs position control to control rack travel to guide the roadwheel. However, due to the lack of mechanical connection between the steering wheel and the road wheels, the driver is not provided with a feel for the road without torque feedback (unlike the case in an EPS as described earlier).

In one or more examples, the HWA 10 that is coupled to the steering column and steering wheel simulates the driver's feel of the road. The HWA 10 may apply tactile feedback in the form of torque to the steering wheel. The HWA 10 receives a rack force signal from the RWA 20 to generate an appropriate torque feel for the driver. Alternatively, the handwheel angle and vehicle speed can also be used to generate desired torque feel to the driver.

As described earlier, in an EPS with mechanical connections between the roadwheel and the handwheel, the driver can feel effects of disturbances directly while steering. Further, in case of such EPS numerous algorithms are known that control or mitigate the effect of such disturbances experienced by the driver (i.e. steering feel), for example, to cancel a low-frequency disturbance felt by driver and thereby making their driving experience more pleasant, to detect surface friction and mitigate its undesirable effects on driving, and such.

For the vehicle 100 with either an EPS or the SbW system 12, any deviation from the normal vehicle/steering operation is generally reflected in steering or vehicle signals, such as handwheel angle, vehicle speed, wheel frequency signals, and the like. Such signals can be used to detect the deviation being experienced by the vehicle 100 at that moment as well as over the time. For example, a vehicle may have wheel imbalance vibrations being reflected in wheel frequency signals; or the vehicle 100 may be understeering or oversteering due to payload change or due to a flat tire. Other vehicle systems may also affect steering behavior. For example, transmission torque imbalance can lead to steering angle change when accelerating the vehicle 100. A known torque steer algorithm in EPS steering system can detect transmission torque's effect on steering and mitigate such effect.

However, compared to the EPS systems, in the SbW system 12, because there is no mechanical connection with the rack unit, the deviations have to be converted into notifications for the driver. Such technical challenges are addressed by the technical solutions described herein, by facilitating one or more components to detect the deviation and measure a level of the detection based on steering and vehicle signals in the RWA 20. This information is further used to provide a notification to the driver using the handwheel. One or more embodiments of the present invention provide techniques for providing a notification to the driver using handwheel unit when one or more deviations have been detected. Aspects of embodiments described herein may be performed by any suitable control system and/or processing device, such as the controller 26.

Figure 2:
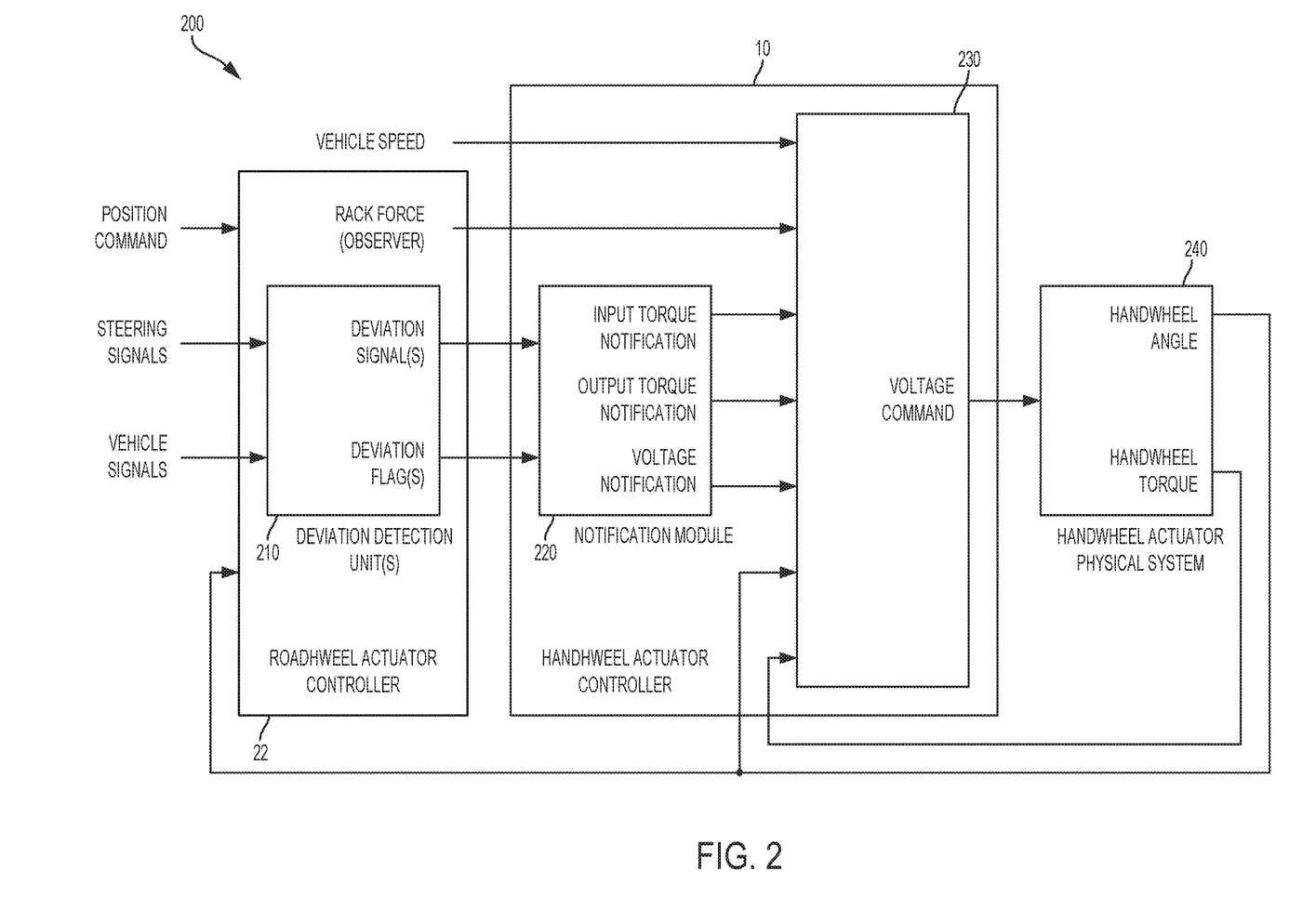
FIG. 2 shows a block diagram of a driver notification system according to one or more embodiments of the present invention.

FIG. 2 shows a block diagram of a driver notification system according to one or more embodiments of the present invention. The driver notification system 200 that is illustrated can be used in the SbW system 12 to provide the driver notification using the HWA 10 based on one or more determinations and signals from the RWA 20.

In one or more examples, the RWA 20 includes one or more Deviation Detection Units (DDU) 210 that detect corresponding deviation in the vehicle or steering behavior. The DDUs 210 detect deviations that can result in a periodic rack force disturbance (e.g. wheel imbalance, brake judder), DC/low frequency disturbance (e.g. pull due to banking or low tire pressure, steering friction), or a mixed frequency signal (e.g. rough road with lot of potholes). The deviation is a difference in an amount of motor torque (or equivalent signal such as rack force) that is generated by the RWA 20 and a reference torque (or rack force) value. The deviation can be a disturbance in the reference torque value that the RWA 20 generates because of road surface irregularities. Alternatively, or in addition, the disturbance can be because of various other sources of irregularities, such as road wheel imbalance, or engine vibrations, and the like, which in turn can have different causes, such as loose mounts, or harmonics based on engine speed etc. The reference torque value can be computed based on either a RWA model or by applying filtering techniques to the torque generated by RWA 20. In one or more examples, a deviation signal is computed by determining a difference between a first signal of the torque that is generated and a second signal that is for an amount of desired/estimated torque based on the input torque command(s) to the RWA 20. It should be noted that the deviation signals, in some instances, can be computed using signals other than the motor torque or rack force, such as signals from vehicle CAN including yaw rate, lateral acceleration, and the like. It should be further noted that the 'rack force' or 'motor torque generated by the RWA' can be interchangeably used throughout the description herein.

In one or more examples, each DDU 210 detects a respective type of deviation. As an example, a DDU 210 can detect vibrations that occur due to brake judder present in a vehicle. Each type of deviation can have a particular pattern in which the rack force output signal from the RWA 20 is varied. Alternatively, a DDU 210 can detect a combination of deviations, for example, that occur due to brake judder as well as those that occur due to potholes. It is understood that the number of DDUs 210 used can vary from one example to another.

The DDU 210 outputs a flag when imbalance vibrations are detected to indicate that a deviation has been detected. Further, the DDU 210 outputs a deviation signal that indicates an amount of rack force contribution of such vibrations.

It should be noted that although FIG. 2 depicts the DDUs 210 as part of the RWA 20, in other examples, the DDUs may not be part of the RWA 20. Instead, for example, the DDUs 210 also reside in the HWA unit, and may receive the rack force signal from the RWA 20. Alternatively, or in addition, the DDUs 210 may be part of the controller 26, or separate from other components. Any other combination of the modules is possible.

Referring to FIG. 2 again, the HWA 10 receives (or computes) the output from the DDU 210 and generates a notification for the driver. In one or more examples, the HWA 10 includes a notification module 220 and a HWA control module 230.

Figure 3:
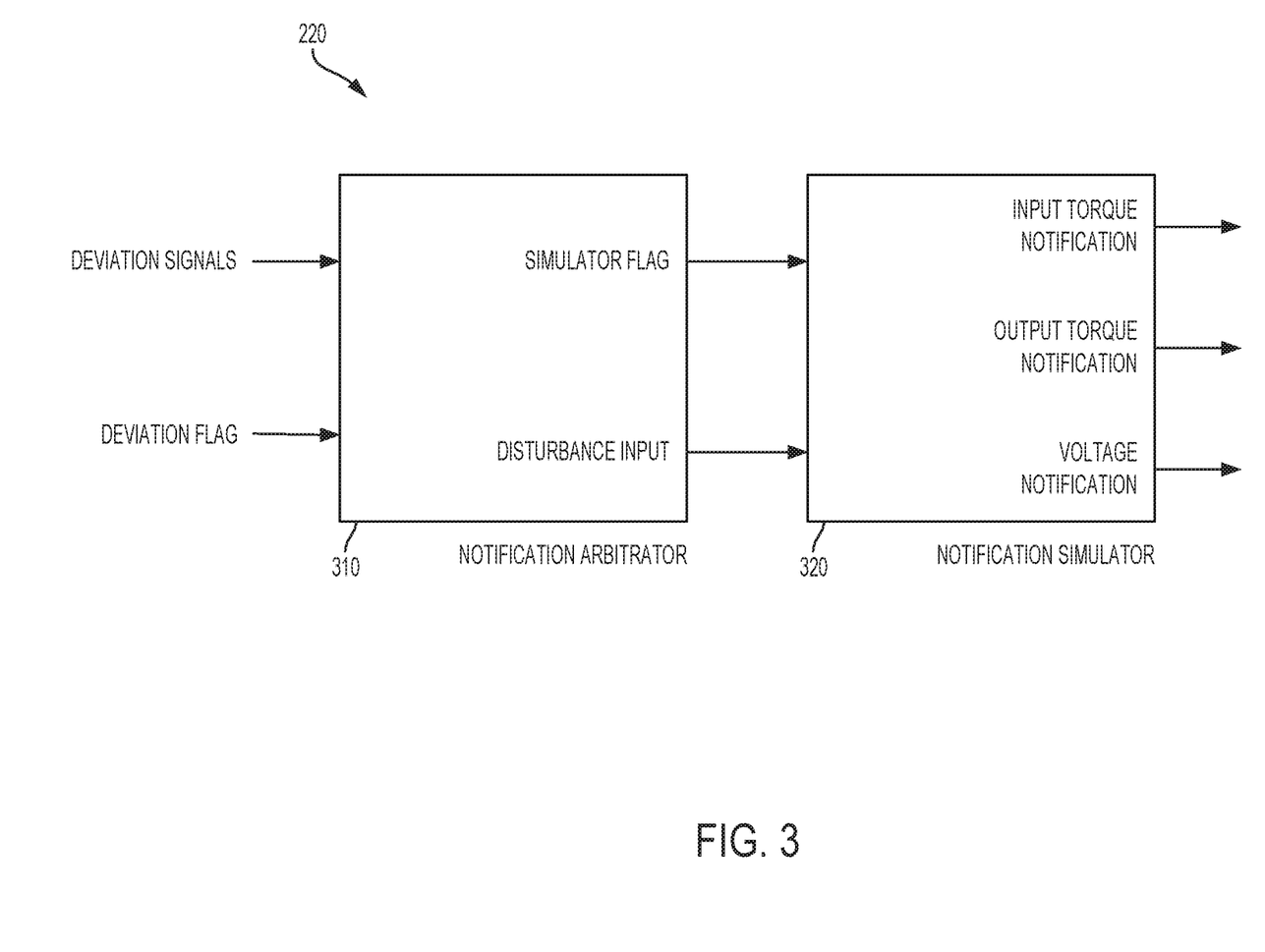
FIG. 3 depicts a block diagram of a notification module according to one or more embodiments of the present invention.

FIG. 3 depicts a block diagram of the notification module 220 according to one or more embodiments of the present invention. The notification module 220 illustrated includes a notification arbitrator 310 and a notification simulator 320. It is understood that in one or more examples, the notification module 220 can include different, fewer, or additional components than those illustrated herein.

The notification arbitrator 310 receives information from the one or more DDUs 210 and prioritizes the detected deviations based on a duration for which corresponding deviation flags are set TRUE. The prioritization can also be based on an amplitude of vibration detected by the DDUs 210, and other factors. The notification arbitrator further determines whether to notify the driver of the detected deviations and accordingly provides a simulator flag value to the notification simulator 320. If a notification is not to be generated, the notification arbitrator 310 sets the simulator flag=FALSE. Otherwise, the notification arbitrator sets the simulator flag=TRUE to instruct the notification simulator 320 to generate a simulated notification for the driver. In this case, when the notification is to be generated, the notification arbitrator 310 also provides, to the notification simulator 320, one or more disturbance signals based on the determined priority list of the detected deviations.

The notification simulator 320 processes the disturbance input information received from the notification arbitrator 310. Based on the input, the notification simulator 320 outputs a combination of notification signals. In a traditional EPS system that includes mechanical linkages, the transfer function from disturbances to handwheel motion is readily determined by the mechanical system design and calibrations. However, for the SbW system 12, because there is no mechanical linkage to the rack, the appropriate effect of road disturbances on the driver feel can be designed with more flexibility and customization. More specifically, the notification simulator 320 can modulate the amplitude, change/shift frequency of the signal or use a predetermined transfer function to translate the disturbance input information to an output notification information.

Figure 4A:
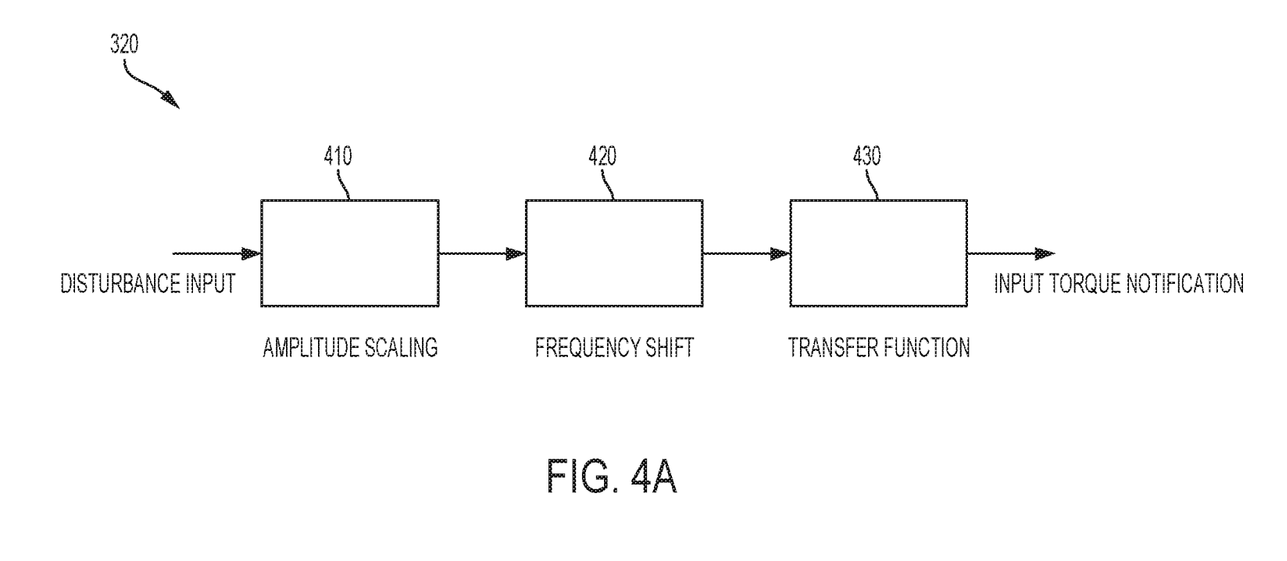
FIG. 4A depicts an example block diagram of a notification simulator according to one or more embodiments of the present invention.

FIG. 4A depicts an example block diagram of the notification simulator 320 according to one or more embodiments of the present invention. In the depicted example, the notification simulator 320 includes, among other components, one or more notification generation modules that use the disturbance input signal received from the notification arbitrator 310 to generate and output a notification signal. The notification signal that is generated can be an input-torque modification command, an output-torque modification command, or a voltage modification command. In one or more examples, the notification signal that is generated is a combination of one or more of an input-torque modification command, an output-torque modification command, and a voltage modification command. As shown in FIG. 2, the one or more components of the notification signal are used to modify a voltage command that is used to generate the feedback torque by the HWA 10.

An amplitude scaling module 410 multiplies the disturbance input with a scalar number/calibration. The scalar use to modify the amplitude of the disturbance input can vary online as a function of different system states, in one or more examples. For example, the scalar may vary based on the vehicle speed, the vehicle acceleration, the handwheel angle, or any other such vehicle state signal. Alternatively, in one or more examples, the scalar may be a predetermined fixed scalar value.

A frequency shift module 420 detects the frequency of the disturbance input signal and produces the notification signal as output with a different frequency than that of the disturbance input and the same amplitude as that of the disturbance input. For example, a brake judder disturbance signal that is received may have a 14 Hz frequency. However, vibrating the handwheel at that frequency may not provide the driver an appropriate feedback of the deviation, and as such vibrations of 25 Hz may be more desirable to catch driver's attention. Accordingly, the frequency shift module 420 scales the frequency of the disturbance input signal, for example, to a predetermined frequency or at least a predetermined minimum frequency.

Figure 4B:
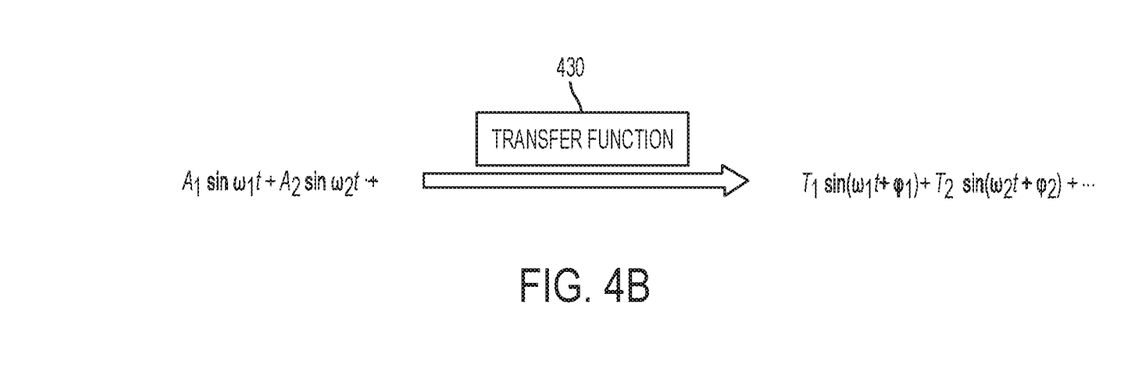
FIG. 4B provides an example transfer function according to one or more embodiments of the present invention.

A transfer function module 430 applies a predetermined transfer function to the disturbance input to produce a modified output signal. A transfer function modifies the magnitude and phase of a signal as a function of input signal frequency. This modifying effect is determined by coefficients of the transfer functions which can be scalar values or based on a function of other states such as vehicle speed. The transfer function applied by the transfer function module 430 can be unique for different types of notification signals (input-torque, output-torque, and voltage). For example, FIG. 4B provides an example transfer function that the transfer function module 430 uses to modify the disturbance input signal and generate the notification signal. In this example, the input signal is be represented as addition of multiple sinusoidal signals such as $A_1 \sin \omega_1 t$, $A_2 \sin \omega_2 t$ etc.

After applying the transfer function, signal component $A_1 \sin \omega_1 t$ is modified to $T_1 \sin(\omega_1 t+\varphi_1)$, i.e. magnitude and phase. This change in magnitude as well as phase is unique for a given frequency, $\omega_1$.

It should be noted that the block diagram shown in FIG. 4A can be used for generating an input torque notification, an output torque notification, and/or a voltage notification.

Figure 5:
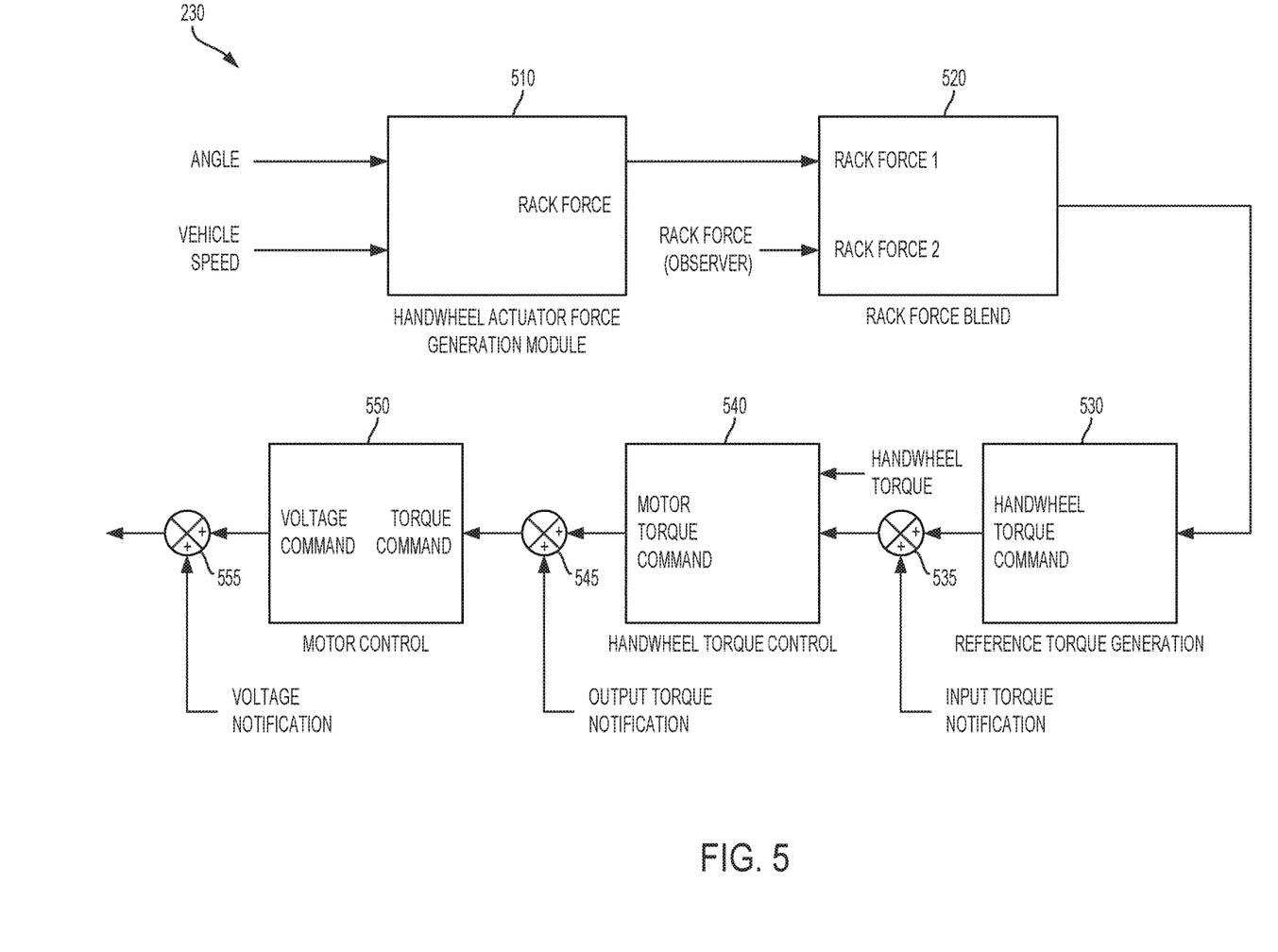
FIG. 5 depicts a block diagram of a HWA control module according to one or more embodiments of the present invention.

FIG. 5 depicts a block diagram of the HWA control module 230 according to one or more embodiments of the present invention. The illustrated example of HWA control module 230 includes, among other components, a HWA rack force generation module 510, a rack force blend module 520, a reference torque generation module 530, a handwheel torque control module 540, and a motor control module 550. It is understood that in other examples, the HWA control module 230 may include additional, fewer, and/or different components than those listed above.

The HWA rack force generation module 510 generates a reference rack force output using handwheel angle signal and vehicle speed signal using one or more techniques that are known. The HWA 10 typically includes a sensor to measure angle of rotation of steering input device (e.g. handwheel). Either a column mounted sensor or a motor angle (i.e. motor of HWA system) can measure such angle. Furthermore, in some cases, this angle can be a RWA angle (indicative of rack position) sent to the HWA 10 from the RWA 20. Such a measured angle is used by the HWA rack force generation module 510. The vehicle speed is also received from a sensor and/or an ECU of the vehicle 100.

In one or more examples, the rack force blend module 520 receives the rack force computed by the HWA rack force generation module 510 as a first rack force in conjunction with a second rack force value from the RWA 20. For example, an observer module (not shown) associated with the RWA 20 can generate the second rack force value. The second rack force from the RWA 20 can be generated in any other known manner. The rack force blend module 520 uses the multiple rack force values received to generate a rack force final signal. For example, the rack force blend module 520 combines the received values using one or more operations such as scaling and adding the first and second rack forces to produce the rack force final value.

Further, the reference torque generation module 530 uses the rack force final signal to generate a corresponding handwheel torque command using known techniques. For example, consider a steady-state rack force final value of 4000 N input produces a handwheel torque of 2 Nm as output, which is input to the handwheel torque control module 540. The handwheel torque is applied by a driver and is measured by a handwheel torque sensor (not shown) that is typically part of the steering system. Furthermore, the input-torque modification command from the notification simulator 320 of the HWA notification module 220 is combined with the handwheel torque command at 535. For example, the input-torque modification command is added by an adder module 535 with the handwheel torque command output from the reference torque generation module 530. The input-torque modification command from the notification simulator accordingly modifies the handwheel torque command that, in turn, provides a voltage command to the HWA for generating a feedback/assist torque to the driver. Therefore, the notification signal facilitates modifying the torque felt by the driver. In one or more examples, to notify the driver of a flat tire, or any other such event a torque pull can be created by adding a bias signal of appropriate value using the techniques described herein using the notification simulator 320 that is configured to generate the notification signal based on the received disturbance input from the RWA 20 accordingly (FIG. 4A).

Further, in one or more examples, the handwheel torque control module 540 performs torque control using commanded and measured handwheel torque signals to produce a motor torque command, which is a current command, using known techniques. The handwheel torque control module 540 receives the handwheel torque command from the reference torque generation module 530. In one or more examples, the received handwheel torque command is the modified handwheel torque command described above. The generated motor torque command that is output by the handwheel torque control module 540 is modified using the output-torque modification command from the notification simulator 320 of the HWA notification module 220, at 545. In one or more examples, the output-torque modification command is added directly to the motor torque command to generate a modified motor torque command by an adder module 545. For example, to let the driver feel the brake judder vibrations, a high frequency (range 10 to 40 Hz) signal can be added to the motor torque command. Because the motors in EPS and SbW systems are torque controlled indirectly via current control (feedback or feedforward current control) the output-torque modification command may be replaced by a current command in one or more examples. For example, the output-torque modification command is converted to the current command that is then added into the motor torque command.

Further yet, the motor control module receives the motor torque command as input and generates, using known techniques, a corresponding voltage command that is applied to the motor of the HWA 10 to generate the corresponding amount of torque feedback for the driver. In one or more examples, the output voltage command is modified using the voltage modification command from the notification simulator 320 of the HWA notification module 220, at 555. The voltage modification command can be added to the voltage command by an adder module 555. The modified voltage command goes to the inverter (not shown) in the HWA torque feedback 10 which controls the electric motor torque. The resulting generated torque gets applied to the HWA unit. The voltage addition can produce either a tactile or an audible output from the motor to notify the driver.

Figure 6:
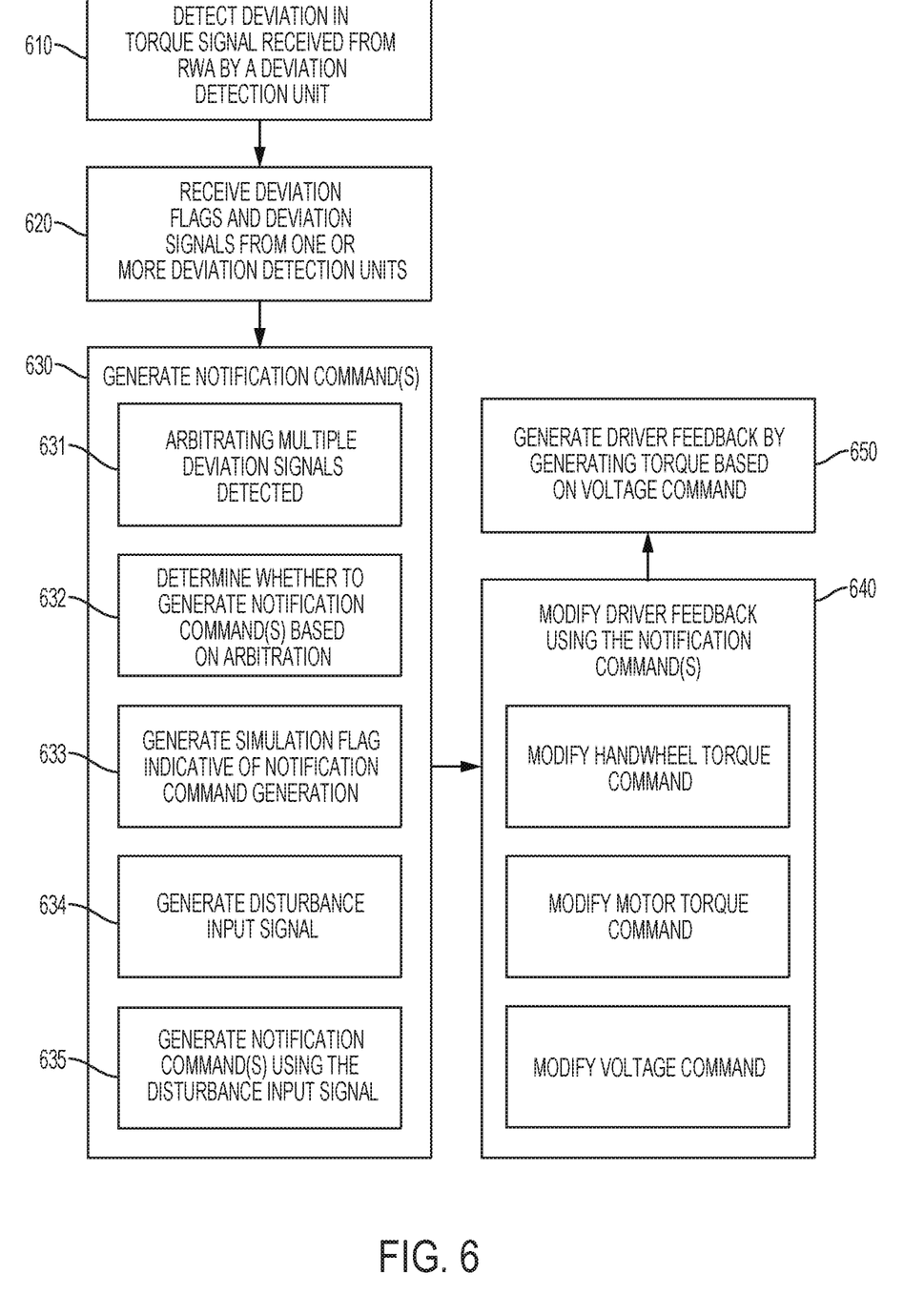
FIG. 6 depicts a flowchart of an example method for generating driver notification using handwheel actuators in steer-by-wire systems according to one or more embodiments of the present invention.

FIG. 6 depicts a flowchart of an example method for generating driver notification using handwheel actuators in steer-by-wire systems according to one or more embodiments of the present invention. The method includes detecting a disturbance/deviation in a torque signal received from the RWA 20, at 610. As described earlier, different DDUs 210 can detect different types of deviations. Each DDU 210 outputs a deviation flag and a deviation signal based on the detected deviation. For example, if a deviation is not detected, the deviation flag is OFF/FALSE, and if the deviation is detected, the deviation flag is ON/TRUE. Further, the deviation signal output by the DDU 210 provides the deviation signal (amplitude and frequency) that is detected.

The method includes receiving deviation flags and deviation signals from multiple such DDUs 210 by the notification module 220 of the HWA 10, at 620. The method further includes generating, by the notification module 220, one or more notification commands based on the detected deviations, at 630. Generating the notification includes arbitrating, by an arbitration module 310, among the one or more deviations, at 631. The arbitration includes determining a duration of each detected deviation by monitoring an amount of time the corresponding deviation flag is ON.

Further, the arbitration can include determining if the amplitude of a detected deviation exceeds a corresponding predetermined threshold. Based on the arbitration, the notification module 220 determines whether to generate a notification command to modify a torque feedback being provided to the driver, at 632. If the duration and/or amplitude of a detected deviation does not exceed predetermined thresholds, the notification module 220 does not generate a notification command, else the notification module generates the notification command(s).

The arbitrator module 310 outputs a simulator flag that indicates whether a notification command is generated, at 633. If the notification command is being generated the simulator flag is set to ON/TRUE else, to OFF/FALSE. The arbitration module 310 further outputs a disturbance input signal indicative of the feedback to be generated for the driver based on the arbitration, at 634.

The disturbance input signal can be a combination of the one or more deviation signals received from the multiple DDUs 210. For example, the disturbance input signal can include a sum of all the deviations received. Alternatively, or in addition, the disturbance input signal is a weighted sum of the deviations, where each DDU 210 is assigned a predetermined weight that is used to scale the deviation signal detected by the DDUs 210, respectively. Any other combination of the deviation signals can be used.

The notification simulator module 320 receives the simulation flag and the disturbance input signal from the arbitration module 310 and generates the notification command (s), at 635. Generating the notification command can include generating an input-torque notification, an output-torque notification, and/or a voltage notification. The notification commands are generated using amplitude scaling, frequency shifting, and/or a transfer function to convert the disturbance input signal.

The method further includes modifying the feedback being generated for the driver using the notification command(s), at 640. The modifying can include modifying one or more of a handwheel torque command, a motor torque command, and/or a voltage command. The handwheel torque command and the motor torque command are used to generate the voltage command. The method further includes generating the driver feedback torque using the voltage command, at 650. The modifications because of the notification command(s) provide a notification to the driver about the one or more events that cause the detected deviations.

The technical solutions described herein facilitate providing notification to driver using HWA unit when one or more deviations have been detected by SbW system. The technical solutions described herein facilitates generating the notification by analyzing one or more deviation signals (e.g. rack force deviation) and deviation flags to output a corresponding notification signal indicative of the deviation(s) detected. The technical solutions can further facilitate modifying one or more of the handwheel torque command, the motor torque command, and the voltage command that are generated by a motor control system of the HWA to generate feedback torque that is provided to the driver. Modifying the torque commands provides a tactile/torque notification via the handwheel by providing input or output torque overlay. Alternatively, or in addition, the voltage notification can provide audible notification in addition to tactile notification. In one or more examples, deviation signal magnitude and deviation flag duration are used to produce a notification signal by scaling, frequency shift, and/or digitally filtering the disturbance input signal.

While the technical solutions are described in detail in connection with only a limited number of embodiments, it should be readily understood that the technical solutions are not limited to such disclosed embodiments. Rather, the technical solutions can be modified to incorporate any number of variations, alterations, substitutions, or equivalent arrangements not heretofore described, but which are commensurate with the spirit and scope of the technical solutions. Additionally, while various embodiments of the technical solutions have been described, it is to be understood that aspects of the technical solutions may include only some of the described embodiments. Accordingly, the technical solutions are not to be seen as limited by the foregoing description.

Having thus described the invention, it is claimed:

1. A steer by wire steering system comprising:
    a processor; and
    a memory including instructions that, when executed by the processor, cause the processor to:
        receive a deviation signal that is indicative of a disturbance experienced by one or more components coupled to a rack;
        generate a modification signal based on the deviation signal, in response to the deviation signal being detected for at least a predetermined duration;
        generate an input command corresponding to a reference torque generated by a road wheel actuator;
        generate a feedback torque for a driver based on the input command;
        generate a modified input command using the input command and the modification signal; and
        provide the modified input command to the driver, the modified input command providing a notification corresponding to the disturbance to the driver.

2. The steer by wire steering system of claim 1, wherein the deviation signal is a plurality of deviation signals.

3. The steer by wire steering system of claim 2, wherein the plurality of deviation signals is received from a plurality of deviation detection units.

4. The steer by wire steering system of claim 1, wherein the modification signal is an input torque modification signal and the modified input command is a handwheel torque command corresponding to the reference torque.

5. The steer by wire steering system of claim 1, wherein the modification signal is an output torque modification signal, and the modified input command is a motor torque command that is generated using a handwheel torque command and a measured handwheel torque.

6. The steer by wire steering system of claim 1, wherein the modification signal is a voltage modification signal and generating the modified input command comprises:
    generating a voltage command corresponding to the input command; and
    modifying the voltage command using the voltage modification signal.

7. The steer by wire steering system of claim 6, wherein the modification voltage command generates an audible notification for the driver.

8. The steer by wire steering system of claim 7, wherein the modified voltage command is applied to a motor of a handwheel actuator to generate the feedback torque and the audible notification.

9. The steer by wire steering system of claim 1, wherein generating the modification signal comprises at least one of:
    frequency shifting the deviation signal;
    amplitude scaling the deviation signal; and
    applying a transfer function to the deviation signal.

10. A method for generating a driver notification in a steer by wire steering system, the method comprising:
- determining, by a processor, a deviation signal that is indicative of a disturbance in one or more components coupled to a rack;
- generating, by the processor, a modification signal based on the deviation signal, in response to the deviation signal being detected for at least a predetermined duration;
- generating, by the processor, a input command corresponding to a reference torque generated by a road wheel actuator;
- generating, by the processor, a feedback torque for a driver based on the input command;
- generating, by the processor, a modified input command using the input command and the modification signal; and
- providing the modified input command to the driver, the modified input command providing a notification corresponding to the disturbance to the driver.

11. The method of claim 10, wherein the deviation signal is a plurality of deviation signals.

12. The method of claim 10, wherein the modification signal is an input torque modification signal and the modified input command is a handwheel torque command corresponding to the reference torque.

13. The method of claim 10, wherein the modification signal is an output torque modification signal, and the modified input command is a motor torque command that is generated using a handwheel torque command and a measured handwheel torque.

14. The method of claim 10, wherein the modification signal is a voltage modification signal and generating the modified input command comprises:
- generating a voltage command corresponding to the input command; and
- modifying the voltage command using the voltage modification signal.

15. The method of claim 14, wherein the modification voltage command generates an audible notification for the driver.

16. A driver notification system comprising:
a processor; and
a memory including instructions that, when executed by the processor, cause the processor to:
- receive a deviation signal in a rack force generated by a road wheel actuator;
- generate a modification signal based on the deviation signal, in response to the deviation signal being detected for at least a predetermined duration;
- generate an input command corresponding to the rack force generated by the road wheel actuator;
- generate a feedback torque for a driver based on the input command, the feedback torque providing one of a tactile feedback and an audible feedback via a steering handwheel component to the driver;
- generate a modified input command using the input command and the modification signal; and
- provide the modified input command to the driver, the modified input command providing a notification corresponding to the deviation to the driver.

17. The driver notification system of claim 16, wherein the deviation signal is a plurality of deviation signals.

18. The driver notification system of claim 16, wherein the modification signal is an input torque modification signal and the modified input command is a handwheel torque command corresponding to the rack force.

19. The driver notification system of claim 16, wherein the modification signal is an output torque modification signal, and the modified input command is a motor torque command that is generated using a handwheel torque command and a measured handwheel torque.

20. The driver notification system of claim 16, wherein the modification signal is a voltage modification signal and generating the modified input command comprises:
- generating a voltage command corresponding to the input command; and
- modifying the voltage command using the voltage modification signal.

* * * * *